United States Patent
Cao et al.

(10) Patent No.: US 10,410,059 B2
(45) Date of Patent: Sep. 10, 2019

(54) CLOUD PLATFORM WITH MULTI CAMERA SYNCHRONIZATION

(71) Applicant: WIZR LLC, Santa Monica, CA (US)

(72) Inventors: Song Cao, Los Angeles, CA (US); Genquan Duan, Beijing (CN)

(73) Assignee: WIZR LLC, Santa Monica, CA (US)

( * ) Notice: Subject to any disclaimer, the term of this patent is extended or adjusted under 35 U.S.C. 154(b) by 34 days.

(21) Appl. No.: 15/413,346

(22) Filed: Jan. 23, 2017

(65) Prior Publication Data

US 2017/0213086 A1 Jul. 27, 2017

Related U.S. Application Data

(60) Provisional application No. 62/281,294, filed on Jan. 21, 2016.

(51) Int. Cl.
| | |
|---|---|
| G06K 9/00 | (2006.01) |
| G11B 27/00 | (2006.01) |
| H04N 7/18 | (2006.01) |
| G06K 9/62 | (2006.01) |
| G11B 27/36 | (2006.01) |
| G11B 27/10 | (2006.01) |

(52) U.S. Cl.
CPC ..... *G06K 9/00718* (2013.01); *G06K 9/00758* (2013.01); *G06K 9/623* (2013.01); *G11B 27/105* (2013.01); *G11B 27/36* (2013.01); *H04N 7/181* (2013.01); *G06K 2009/00738* (2013.01)

(58) Field of Classification Search
CPC .. G06K 9/68; G06K 9/00718; G06K 9/00771; H04N 5/225; G06F 11/36

USPC .......................................................... 348/159
See application file for complete search history.

(56) References Cited

U.S. PATENT DOCUMENTS

| | | |
|---|---|---|
| 6,867,799 B2 | 3/2005 | Broemmelsiek |
| 8,280,112 B2 | 10/2012 | Casamona et al. |
| 8,300,953 B2 | 10/2012 | Lindley et al. |
| 8,856,121 B1 | 10/2014 | Makki et al. |
| 9,158,974 B1 | 10/2015 | Laska et al. |

(Continued)

OTHER PUBLICATIONS

International Search Report dated Apr. 6, 2017 as received in Application No. PCT/US2017/014631.

(Continued)

*Primary Examiner* — Patricia I Young
(74) *Attorney, Agent, or Firm* — Maschoff Brennan (57) ABSTRACT

A computer-implemented method to compare events from videos including monitoring two or more videos and identifying a first event in a first video, determining a first feature description of the first event, a first location of the first event, and a first time stamp of the first event, identifying a second event in a second video of the two or more videos, determining a second feature description of the second event, a second location of the second event, and a second time stamp of the second event, comparing the first and second feature description, the first and second location, and the first and second time stamp. The method may include classifying the first event and the second event as correlated events determined to be sufficiently similar and classifying the first event and the second event as not correlated events when determined not to be sufficiently similar.

9 Claims, 5 Drawing Sheets

(56) References Cited

U.S. PATENT DOCUMENTS

2014/0176708 A1* 6/2014 Ramakrishnan ... G06K 9/00771
  348/143
2016/0335175 A1* 11/2016 Copos ................. G06F 11/3684

OTHER PUBLICATIONS

Written Opinion of the International Searching Authority dated Apr. 6, 2017 as received in Application No. PCT/US2017/014631.

* cited by examiner

CLOUD PLATFORM WITH MULTI CAMERA SYNCHRONIZATION

CROSS-REFERENCE TO A RELATED APPLICATION

This application claims the benefit of and priority to U.S. Provisional Application No. 62/281,294, filed on Jan. 21, 2016, titled "CLOUD PLATFORM WITH MULTI CAMERA SYNCHRONIZATION," which is incorporated herein by reference in its entirety.

BACKGROUND

Modern video surveillance systems provide features to assist those who desire safety or security. One such feature is automated monitoring of the video created by surveillance cameras. A video surveillance system may include a video processor to detect when events occur in the videos created by a surveillance camera system.

The subject matter claimed herein is not limited to embodiments that solve any disadvantages or that operate only in environments such as those described above. Rather, this background is only provided to illustrate one example technology area where some embodiments described herein may be practiced.

SUMMARY

A computer-implemented method to compare events from videos is disclosed. The method may include monitoring two or more videos and identifying a first event in a first video of the two or more videos. The method may include determining a first feature description of the first event, a first location of the first event, and a first time stamp of the first event. The method may also include identifying a second event in a second video of the two or more videos. The method may include determining a second feature description of the second event, a second location of the second event, and a second time stamp of the second event. The method may include comparing the first feature description with the second feature description, the first location with the second location, and the first time stamp with the second time stamp. The method may include classifying the first event and the second event as correlated events when at least one of the first feature description, the first location, and the first time stamp is determined to be sufficiently similar to the second feature description, the second location, and the second time stamp. The method may include classifying the first event and the second event as not correlated events when the first feature description, the first location, and the first time stamp are determined not to be sufficiently similar to the second feature description, the second location, and the second time stamp.

These illustrative embodiments are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings.

DISCLOSURE

Systems and methods are disclosed for multi-camera synchronization of events. Systems and methods are also disclosed for creating summarization videos. Systems and methods are also disclosed for predicting the future location of events within a video frame.

Figure 1:
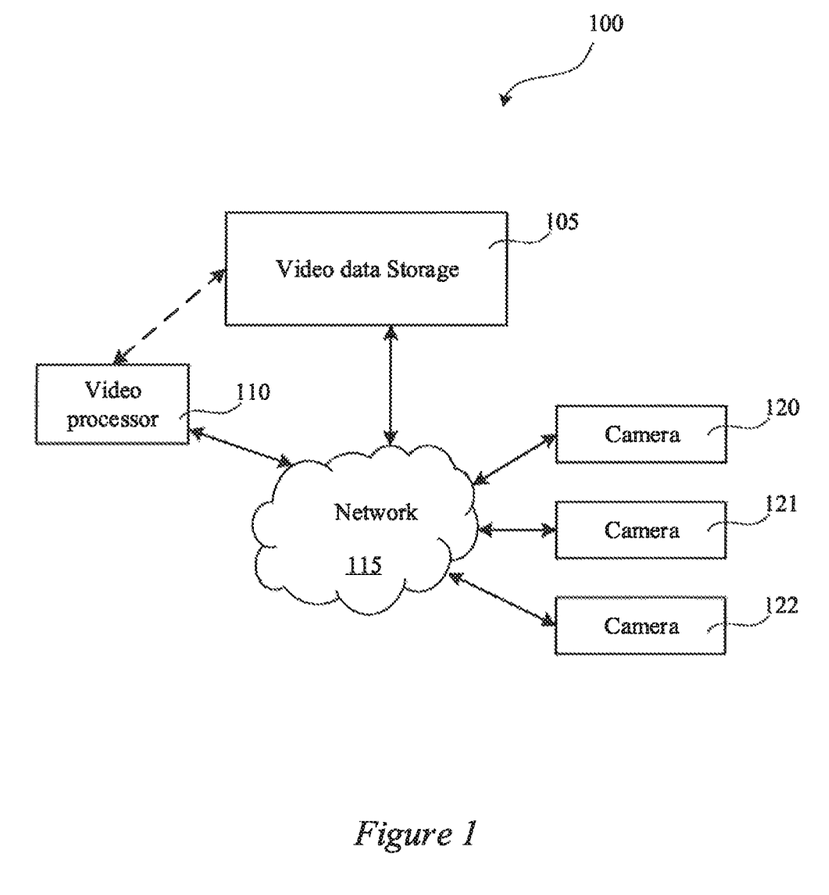
FIG. 1 illustrates a block diagram of a system 100 for multi-camera synchronization.

FIG. 1 illustrates a block diagram of a system 100 that may be used in various embodiments. The system 100 may include a plurality of cameras: camera 120, camera 121, and camera 122. While three cameras are shown, any number of cameras may be included. These cameras may include any type of video camera such as, for example, a wireless video camera, a black and white video camera, surveillance video camera, portable cameras, battery powered cameras, CCTV cameras, Wi-Fi enabled cameras, smartphones, smart devices, tablets, computers, GoPro cameras, wearable cameras, etc. The cameras may be positioned anywhere such as, for example, within the same geographic location, in separate geographic locations, positioned to record portions of the same scene, positioned to record different portions of the same scene, etc. In some embodiments, the cameras may be owned and/or operated by different users, organizations, companies, entities, etc.

The cameras may be coupled with the network 115. The network 115 may, for example, include the Internet, a telephonic network, a wireless telephone network, a 3G network, etc. In some embodiments, the network may include multiple networks, connections, servers, switches, routers, connections, etc., that may enable the transfer of data. In some embodiments, the network 115 may be or may include the Internet. In some embodiments, the network may include one or more LAN, WAN, WLAN, MAN, SAN, PAN, EPN, and/or VPN.

In some embodiments, one or more of the cameras may be coupled with a base station, digital video recorder, or a controller that is then coupled with the network 115.

The system 100 may also include video data storage 105 and/or a video processor 110. In some embodiments, the video data storage 105 and the video processor 110 may be coupled together via a dedicated communication channel that is separate from or part of the network 115. In some embodiments, the video data storage 105 and the video processor 110 may share data via the network 115. In some embodiments, the video data storage 105 and the video processor 110 may be part of the same system or systems.

In some embodiments, the video data storage 105 may include one or more remote or local data storage locations such as, for example, a cloud storage location, a remote storage location, etc.

In some embodiments, the video data storage 105 may store video files recorded by one or more of camera 120, camera 121, and camera 122. In some embodiments, the video files may be stored in any video format such as, for example, mpeg, avi, etc. In some embodiments, video files from the cameras may be transferred to the video data storage 105 using any data transfer protocol such as, for example, HTTP live streaming (HLS), real time streaming protocol (RTSP), Real Time Messaging Protocol (RTMP), HTTP Dynamic Streaming (HDS), Smooth Streaming, Dynamic Streaming over HTTP, HTML5, Shoutcast, etc.

In some embodiments, the video data storage 105 may store user identified event data reported by one or more individuals. The user identified event data may be used, for example, to train the video processor 110 to capture feature events.

In some embodiments, a video file may be recorded and stored in memory located at a user location prior to being transmitted to the video data storage 105. In some embodiments, a video file may be recorded by the camera and streamed directly to the video data storage 105.

In some embodiments, the video processor 110 may include one or more local and/or remote servers that may be used to perform data processing on videos stored in the video data storage 105. In some embodiments, the video processor 110 may execute one or more algorithms on one or more video files stored within the video storage location. In some embodiments, the video processor 110 may execute a plurality of algorithms in parallel on a plurality of video files stored within the video data storage 105. In some embodiments, the video processor 110 may include a plurality of processors (or servers) that each execute one or more algorithms on one or more video files stored in video data storage 105. In some embodiments, the video processor 110 may include one or more of the components of computational system 500 shown in FIG. 5.

Figure 2:
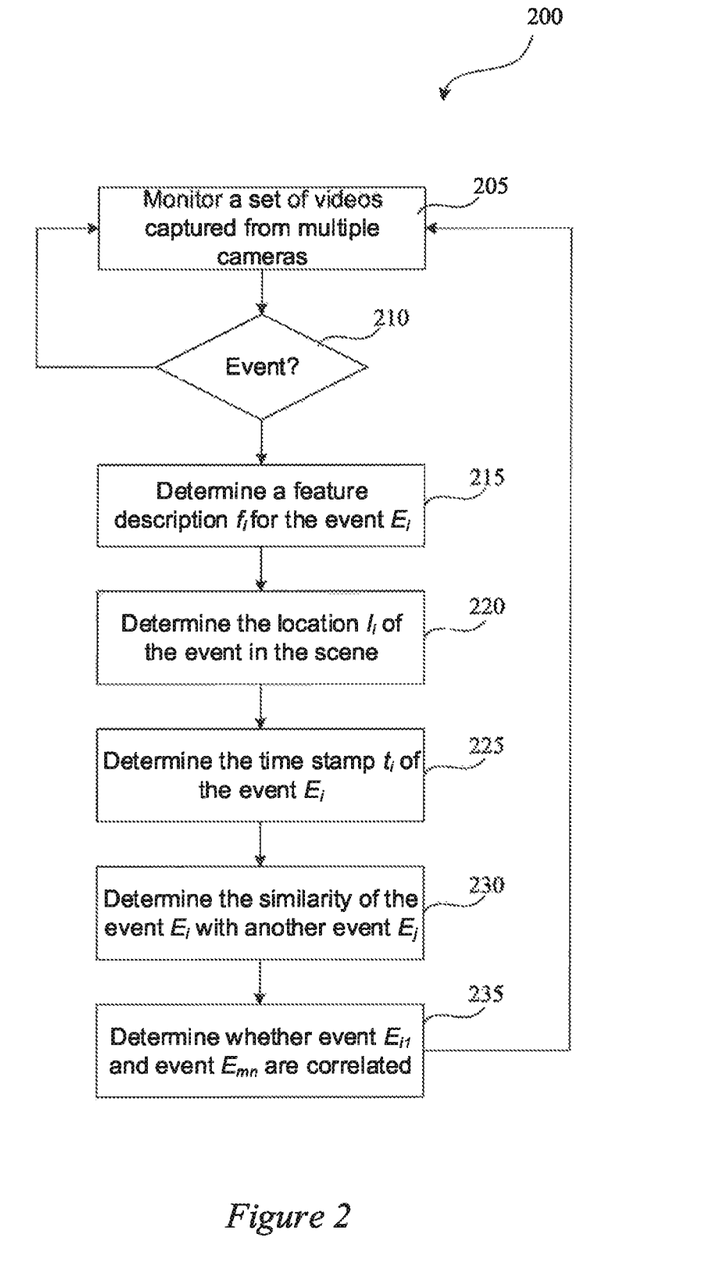
FIG. 2 is a flowchart of an example process for determining a similarity between two events recorded by one or more cameras according to some embodiments.

FIG. 2 is a flowchart of an example process 200 for determining a similarity between two events recorded by one or more cameras according to some embodiments. One or more steps of the process 200 may be implemented, in some embodiments, by one or more components of system 100 of FIG. 1, such as video processor 110. Although illustrated as discrete blocks, various blocks may be divided into additional blocks, combined into fewer blocks, or eliminated, depending on the desired implementation.

Process 200 begins at block 205 where a set of videos stored in a storage location such as, for example, video data storage 105, may be monitored by one or more processors such as, for example, video processor 110. In some embodiments, the set of videos may be stored in different local and/or remote storage locations. The separate storage locations, for example, may include local storage locations and/or remote storage locations relative to the video processor 110 that can be accessed by the video processor 110 directly and/or through the network 115.

A video $V_i$ may be stored in the storage location that was recorded by camera $C_i$, where i is a number between 1 and the total number of videos stored in the storage location and/or the number of cameras. The video $V_i$ may include a plurality of events $E_{ij}$, where j represents the number of events within a given video $V_i$.

At block 210 it may be determined that an event $E_{i1}$ has occurred in a video $V_i$ recorded by camera $C_i$. In some embodiments, low level events may be detected in block 210 such as, for example, motion detection events. In some embodiments, a feature detection algorithm may be used to determine that event $E_{i1}$ has occurred. In some embodiments, the feature description can be determined using a low level detection algorithm. In some embodiments, block 210 may occur in conjunction with block 215.

An event may include any number or type of occurrences captured by a video camera and stored in a video file. An event may include, for example, a person moving through a scene, a car or an object moving through a scene, a particular face entering the scene, a face, a shadow, animals entering the scene, an automobile entering or leaving the scene, etc.

If an event has not been found as determined by block 210, then the process 200 returns to block 205. If an event has been found, then the process 200 proceeds to block 215.

At block 215 a feature description $f_{i1}$ can be determined for the event $E_{i1}$. The feature description $f_{i1}$ may be determined using a feature detector algorithm such as, for example, SURG, SIFT, GLOH, HOG, Affine shape adaptation, Harris affine, Hessian affine, etc. In some embodiments, the feature description can be determined using a high level detection algorithm. Various other feature detector algorithms may be used. In some embodiments, the feature description $f_{i1}$ may be saved in the video storage location such as, for example, as metadata associated with the video $V_i$.

At block 220 the location $l_{i1}$ of the feature $f_{i1}$ may be determined. The location $l_{i1}$ of the feature $f_{i1}$ may be determined in the scene or in the camera frame. The location $l_{i1}$, for example, may be represented in pixels. In some embodiments, the feature $f_{i1}$ may cover a number of pixels within a scene, the location $l_{i1}$ may then be determined from the center of the feature $f_{i1}$. In some embodiments, the location $l_{i1}$ may be saved in the video storage location such as, for example, as metadata associated with the video $V_i$.

At block 225 a time stamp $t_{i1}$ of the feature may be determined. In some embodiments, the timestamp may be an absolute time relative to some standard time. In some embodiments, the time stamp $t_{i1}$ may be saved in the video storage location such as, for example, as metadata associated with the video $V_i$.

At block 230 a similarity measure may be determined for the event $E_{i1}$ relative to another event $E_{j1}$. In some embodiments, the similarity measure may be determined from the following equation:

$$\delta(E_{i1}, E_{mn}) = \omega_1 \Sigma(f_{i1} - f_{mn}) + \omega_2 \cdot d(l_{i1}, l_{mn}) + \omega_3 |t_{i1} - t_{mn}|,$$

where $\omega_1$, $\omega_2$, and $\omega_3$ are constants that may be fixed for each camera, $1 \leq m \leq$ number of videos, $1 \leq n \leq$ number of features in video $V_m$, and $d(l_{i1}, l_{mn})$ represent the Manhattan distance between the location $l_{i1}$ and location $l_{mn}$. $\omega_1$, for example, may be equal to the inverse of n: $\omega_1 = 1/n$. $\omega_2$, for example, may be a value between 0 and 10. In a specific example, $\omega_2 = 1$. $\omega_3$, for example, may be a value between 0 and 10. In a specific example, $\omega_3 = 1$.

At block 235 it can be determined whether the event $E_{i1}$ and the event $E_{mn}$ are related. For example, the events may be considered to be correlated if the similarity between the events is less than a threshold: $\delta(E_{i1}, E_{mn}) < T$; where T is a threshold value. For example, the threshold value T=0.1, 0.2, 0.3, 0.4, 0.5, 0.6, 0.7, 0.8, 0.9, etc. If the event $E_{i1}$ and the event $E_{mn}$ are correlated the two events may capture the same occurrence from the two different cameras $C_i$ and $C_m$.

The process 200 may be repeated for each video in the storage location or for specific videos in the storage location.

In some embodiments a greedy method may be used to find events to be correlated. In some embodiments, block 235 may determine the similarity between two events if the two videos or portions of the two videos are captured within a time window and/or if the two videos or portions of the two videos capture scenes that are with a specific geographic region relative to one another. For example, if an event $E_{11}$ is found in a video file recorded by camera 120 and camera 121 is physically close to camera 120, and/or camera 121 recorded a video file that is temporally close to event $E_{11}$ then process 200 may correlate event $E_{11}$ with events recorded with the video file produced by camera 121.

Figure 3:
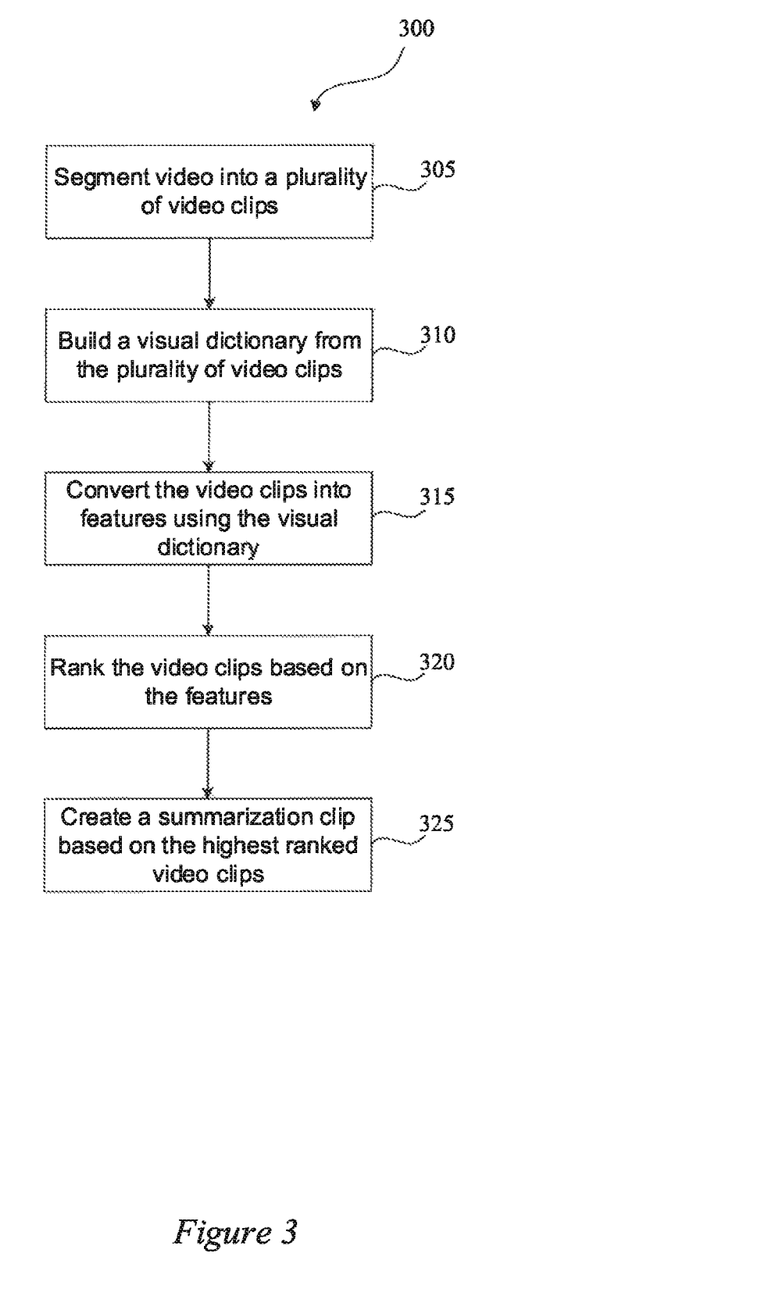
FIG. 3 is a flowchart of an example process for summarizing video from a camera according to some embodiments.

FIG. 3 is a flowchart of an example process 300 for summarizing video from a camera according to some embodiments. One or more steps of the process 300 may be implemented, in some embodiments, by one or more components of system 100 of FIG. 1, such as video processor 110. Although illustrated as discrete blocks, various blocks may be divided into additional blocks, combined into fewer blocks, or eliminated, depending on the desired implementation.

Process 300 begins at block 305 where video such as, for example, a video file from a camera, is segmented into a plurality of clips. For example, one or more videos representing all the video recorded from a camera during a time period may be segmented into a plurality of clips of a short duration. In some embodiments, the time period may be forty-eight, thirty-six, twenty-four, twelve, six, one, etc. hours. In some embodiments, the short duration may be sixty, thirty, fifteen, ten, five, one, etc., seconds. In some embodiments, segmented video clips of the short duration may be created as individual files. In some embodiments, segmented video clips may be created virtually by identifying the beginning and end points of virtual video clips within the original video files.

At block 310 a visual dictionary may be created from the plurality of video clips. In some embodiments, the video dictionary may be built using an unsupervised method such as, for example, using a k-means to cluster segment video clips. Each class center of the segmented video clips may be labeled as a concept in the visual dictionary.

The visual dictionary may identify the visual features within the plurality of video clips. The visual dictionary may include faces, unique faces, background features, objects, animals, movement trajectories, color schemes, shading, brightness, etc. In some embodiments, the visual dictionary may be created from the video clips or other video files' scenes recorded by the same camera. In some embodiments, the visual dictionary may identify features and/or occurrences that differ from the background.

At block 315 the video clip may be converted into features using the visual dictionary. The visual dictionary, for example, may represent a plurality of video concepts. These concepts may include, for example, features, actions, events, etc., such as, for example, walking, running, jumping, standing, automobiles, colors, animals, numbers, names, faces, etc. The video clip may be compared with the video clip and a concept confidence score may be associated with the video clip based on the correlation or comparison of the video clip with concepts in the visual dictionary. These confidence scores may be associated with the video clip as descriptions and/or features of the video clip.

At block 320 the video clips may be ranked based on the features. For example, video clips with more unique features may be ranked higher than video clips with fewer unique features. As another example, video clips showing the background scene or mostly the background scene may be ranked lower. In some embodiments, video clips may be sorted based on the number of features or unique features in each video clip.

At block 325 a summarization video clip may be created from the highest ranked video clips. In some embodiments, the summarization video clip may have a specific length such as, for example, five, two, one, etc., minute. The summarization video clip may be created, for example with portions of each video clip ranked above a certain amount or including a specific number of features. As another example, the summarization video clip may be created from a specific number of video clips. For example, for a one minute summarization video clip the top fifteen highest ranked video clips may be used. As another example, for a one minute summarization video clip the seven highest ranked video clips may be used.

Figure 4:
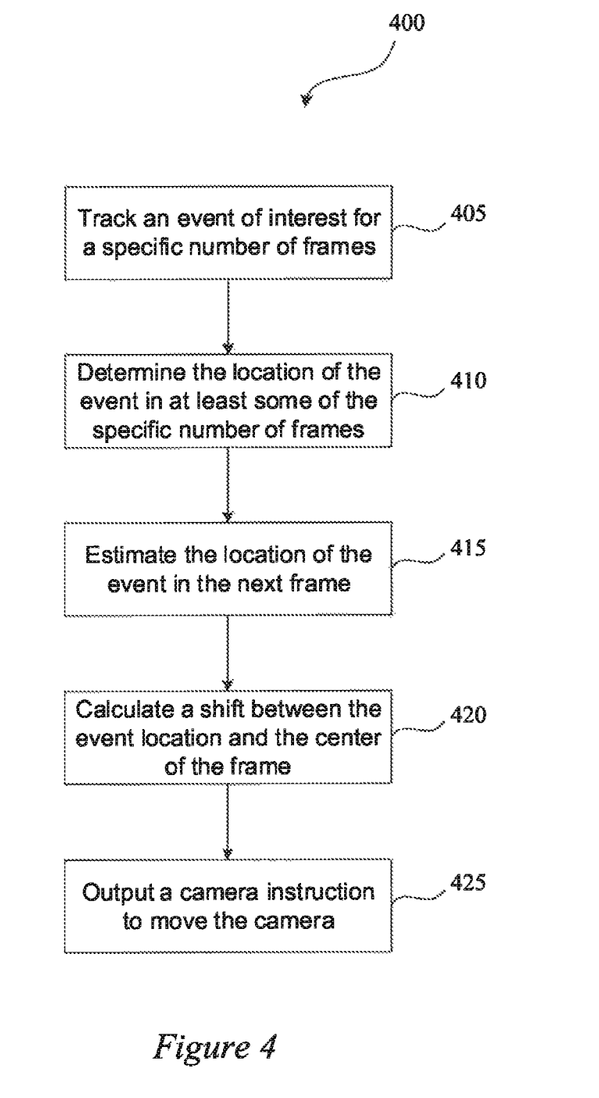
FIG. 4 is a flowchart of an example process for predicting the future location of an event in video frame and/or outputting a control value to a camera to track the event according to some embodiments.

FIG. 4 is a flowchart of an example process 400 for predicting the future location of an event in a video frame and/or outputting a control value to a camera to track the event according to some embodiments. One or more steps of the process 400 may be implemented, in some embodiments, by one or more components of system 100 of FIG. 1, such as video processor 110, camera 120, camera 121, and/or camera 122. Although illustrated as discrete blocks, various blocks may be divided into additional blocks, combined into fewer blocks, or eliminated, depending on the desired implementation.

Process 400 begins at block 405 where an event (or feature) is tracked through a specific number of frames. An event can be determined, for example, in a manner similar to what is described in conjunction with block 210 or block 215 of process 200 shown in FIG. 2. The specific number of frames, for example, may include 2, 3, 4, 5, 6, 8, 10, 12, 15, 20, 25, or 30 frames.

At block 410 the location of the event may be determined in at least some of the specific number of frames. The location of the event can be determined, for example, in a manner similar to what is described in conjunction with block 220 of process 200 shown in FIG. 2. The location of the event, for example, may include a vertical position, a horizontal position, a width, and/or a height of the event within a frame in pixel dimensions. The location may be written as $r_{i,j}=(x, y, w, h)$, where i represents the frame, j represents the camera, x represents the horizontal location of the event, y represents the vertical location of the event, w represents the width of the event, and h represents the height of the event.

At block 415 the location of the event in a subsequent frame such as, for example, frame i+n, where n is any number greater than 1, may be estimated. The location of the event in the subsequent frame may be determined based on the trajectory of the event in the specific number of frames. For example, the rate of change of the event through the previous specific number of frames can be estimated and then used to estimate the location of the event in the subsequent frame. Various other techniques may be used to track events.

At block 420 one or more shift values between the event location and the center of the frame in the subsequent frames can be determined based on the estimate found in block 415. At block 425 a camera instruction may be output that specifies a camera movement that centers the event in subsequent frames. In response, for example, the camera may be moved to center the event in the frame.

In some embodiments, there may be a delay between estimating the event in a subsequent frame and the response of the camera to a movement instruction. In such embodiments, the estimate of the location of the event in a subsequent frame may be made for a frame corresponding to the delay. For example, if the delay is five frames, then an estimate may be made for an additional frame plus the delay frames: i+6 frames.

In some embodiments, $r_{i+n,j}$ can be compared with estimated $r_{i+n,j}$. If $r_{i+n,j}$ and estimated $r_{i+n,j}$ are found to be similar then in future frames a region of interest defined by $r_{i+n,j}$ can be determined and subsequent feature detections can occur within this region of interest. In some embodiments, the region of interest may include a buffer of a few pixels surrounding $r_{i+n,j}$.

In some embodiments, video processing may be sped up by decreasing the data size of a video. For example, a video may be converted into a second video by compressing the video, decreasing the resolution of the video, lowering the frame rate, or some combination of these. For example, a video with a 20 frame per second frame rate may be converted to a video with a 2 frame per second frame rate. As another example, an uncompressed video may be compressed using any number of video compression techniques.

Figure 5:
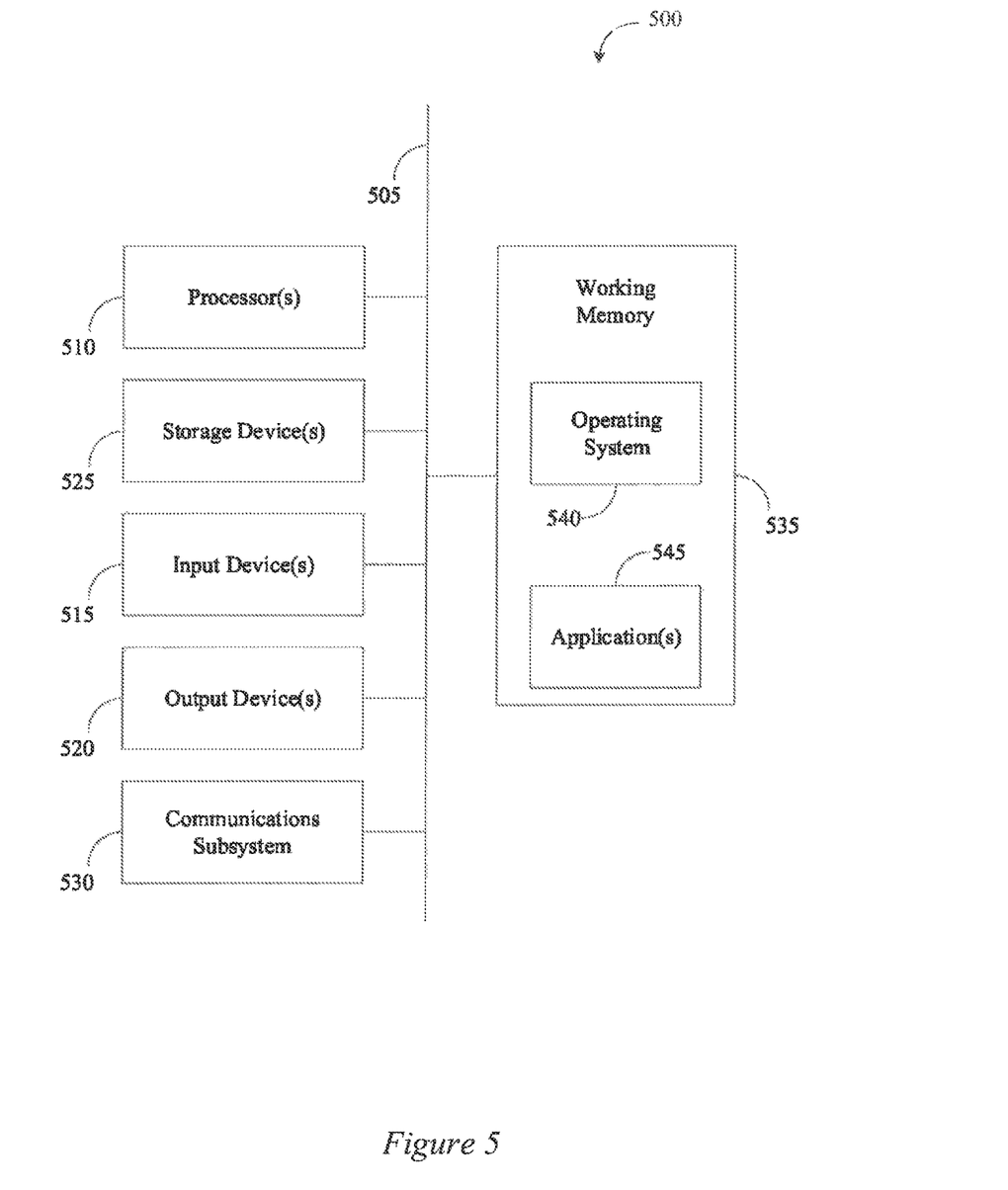
FIG. 5 shows an illustrative computational system for performing functionality to facilitate implementation of embodiments described herein.

The computational system 500 (or processing unit) illustrated in FIG. 5 can be used to perform and/or control operation of any of the embodiments described herein. For example, the computational system 500 can be used alone or in conjunction with other components. As another example, the computational system 500 can be used to perform any calculation, solve any equation, perform any identification, and/or make any determination described here.

The computational system 500 may include any or all of the hardware elements shown in the figure and described herein. The computational system 500 may include hardware elements that can be electrically coupled via a bus 505 (or may otherwise be in communication, as appropriate). The hardware elements can include one or more processors 510, including, without limitation, one or more general-purpose processors and/or one or more special-purpose processors (such as digital signal processing chips, graphics acceleration chips, and/or the like); one or more input devices 515, which can include, without limitation, a mouse, a keyboard, and/or the like; and one or more output devices 520, which can include, without limitation, a display device, a printer, and/or the like.

The computational system 500 may further include (and/or be in communication with) one or more storage devices 525, which can include, without limitation, local and/or network-accessible storage and/or can include, without limitation, a disk drive, a drive array, an optical storage device, a solid-state storage device, such as random access memory ("RAM") and/or read-only memory ("ROM"), which can be programmable, flash-updateable, and/or the like. The computational system 500 might also include a communications subsystem 530, which can include, without limitation, a modem, a network card (wireless or wired), an infrared communication device, a wireless communication device, and/or chipset (such as a Bluetooth® device, an 802.6 device, a Wi-Fi device, a WiMAX device, cellular communication facilities, etc.), and/or the like. The communications subsystem 530 may permit data to be exchanged with a network (such as the network described below, to name one example) and/or any other devices described herein. In many embodiments, the computational system 500 will further include a working memory 535, which can include a RAM or ROM device, as described above.

The computational system 500 also can include software elements, shown as being currently located within the working memory 535, including an operating system 540 and/or other code, such as one or more application programs 545, which may include computer programs of the invention, and/or may be designed to implement methods of the invention and/or configure systems of the invention, as described herein. For example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 525 described above.

In some cases, the storage medium might be incorporated within the computational system 500 or in communication with the computational system 500. In other embodiments, the storage medium might be separate from the computational system 500 (e.g., a removable medium, such as a compact disc, etc.), and/or provided in an installation package, such that the storage medium can be used to program a general-purpose computer with the instructions/code stored thereon. These instructions might take the form of executable code, which is executable by the computational system 500 and/or might take the form of source and/or installable code, which, upon compilation and/or installation on the computational system 500 (e.g., using any of a variety of generally available compilers, installation programs, compression/decompression utilities, etc.), then takes the form of executable code.

The term "substantially" means within 5% or 10% of the value referred to or within manufacturing tolerances.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing art to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical, electronic, or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for-purposes of example rather than limitation, and does not preclude inclusion of such modifications, variations, and/or additions to the present subject matter as would be readily apparent to one of ordinary skill in the art.

What is claimed is:

1. A computer-implemented method to synchronize events from videos captured in a multi-camera system, the method comprising:
   determining a valid input sequence for an unknown binary program;
   monitoring two or more videos received from at least two cameras of the multi-camera system;
   identifying a first event in a first video of the two or more videos;
   determining a first feature description of the first event;
   determining a first location of the first event;
   determining a first time stamp of the first event;
   identifying a second event in a second video of the two or more videos;
   determining a second feature description of the second event;
   determining a second location of the second event;
   determining a second time stamp of the second event;
   comparing the first feature description with the second feature description, the first location with the second location, and the first time stamp with the second time stamp;
   determining a similarity measure between the first event and the second event based on the comparison of the first feature description with the second feature description, the first location with the second location, and the first time stamp with the second time stamp;
   classifying the first event and the second event as correlated events when the similarity measure between the first event and the second event is less than a predetermined threshold such that at least one of the first feature description, the first location, and the first time stamp is determined to be sufficiently similar to the second feature description, the second location, and the second time stamp;
   classifying the first event and the second event as not correlated events when the similarity measure between the first event and the second event is equal to or greater than a predetermined threshold such that the first feature description, the first location, and the first time stamp are determined not to be sufficiently similar to the second feature description, the second location, and the second time stamp;
   identifying the first event in two or more first frames of the first video;
   estimating a first future location of the first event in a subsequent frame of the first video based on the first location of the first event in the two or more first frames of the first video;
   determining a shift between a center of the two or more first frames and the estimated first future location of the first event;
   providing the shift to a source of the first video;
   adjusting the source of the first video based on the shift; and
   wherein the source of the first video is a camera and wherein adjusting the source of the first video comprises adjusting the camera to center the first event in a frame of the camera.

2. The method of claim 1, wherein the first event and the second event comprise a person moving through a scene, a car moving through a scene, an object moving through a scene, a particular face entering the scene, a face, a shadow, an animal entering a scene, or an automobile entering or leaving a scene.

3. The method of claim 1, further comprising:
   determining a first geographic location of the first video;
   determining a second geographic location of the second video;
   preliminarily classifying the first event and the second event as correlated events when at least one of the first geographic location and the first time stamp is determined to be sufficiently similar to the second geographic location and the second time stamp; and
   preliminarily classifying the first event and the second event as not correlated events when the first geographic location and the first time stamp are determined not to be sufficiently similar to the second geographic location and the second time stamp.

4. A system for synchronizing events from videos captured in a multi-camera system, the system comprising:
   a network;
   one or more video data storage locations communicatively coupled with the network; one or more video processors communicatively coupled to the network and configured to:
   monitor two or more videos received from at least two cameras of the multi-camera system;
   determining a valid input sequence for an unknown binary program;
   identify a first event in a first video of the two or more videos;
   determine a first feature description of the first event;
   determine a first location of the first event;
   determine a first time stamp of the first event;
   identify a second event in a second video of the two or more videos;

determine a second feature description of the second event;
determine a second time stamp of the second event;
compare the first feature description with the second feature description, the first location with the second location, and the first time stamp with the second time stamp;
determining a similarity measure between the first event and the second event based on the comparison of the first feature description with the second feature description, the first location with the second location, and the first time stamp with the second time stamp;
classifying the first event and the second event as correlated events when the similarity measure between the first event and the second event is less than a predetermined threshold such that at least one of the first feature description, the first location, and the first time stamp is determined to be sufficiently similar to the second feature description, the second location, and the second time stamp;
classifying the first event and the second event as not correlated events when the similarity measure between the first event and the second event is equal to or greater than a predetermined threshold such that the first feature description, the first location, and the first time stamp are determined not to be sufficiently similar to the second feature description, the second location, and the second time stamp;
identifying the first event in two or more first frames of the first video;
estimating a first future location of the first event in a subsequent frame of the first video based on the first location of the first event in the two or more first frames of the first video;
determining a shift between a center of the two or more first frames and the estimated first future location of the first event;
providing the shift to a source of the first video;
adjusting the source of the first video based on the shift; and
wherein the source of the first video is a camera and wherein adjusting the source of the first video comprises adjusting the camera to center the first event in a frame of the camera.

5. The system of claim 4, wherein the first event and the second event comprise a person moving through a scene, a car moving through a scene, an object moving through a scene, a particular face entering the scene, a face, a shadow, an animal entering a scene, or an automobile entering or leaving a scene.

6. The system of claim 4, wherein the one or more video processors are further configured to:
determine a first geographic location of the first video;
determine a second geographic location of the second video;
preliminarily classify the first event and the second event as correlated events when at least one of the first geographic location and the first time stamp is determined to be sufficiently similar to the second geographic location and the second time stamp; and
preliminarily classify the first event and the second event as not correlated events when the first geographic location and the first time stamp are determined not to be sufficiently similar to the second geographic location and the second time stamp.

7. One or more non-transitory computer readable media that include instructions that when executed by one or more processors perform operations to synchronize events from videos captured in a multi-camera system, the operations comprising:
monitor two or more videos received from at least two cameras of the multi-camera system;
determining a valid input sequence for an unknown binary program;
identify a first event in a first video of the two or more videos;
determine a first feature description of the first event;
determine a first location of the first event;
determine a first time stamp of the first event;
identify a second event in a second video of the two or more videos;
determine a second feature description of the second event;
determine a second location of the second event;
determine a second time stamp of the second event;
compare the first feature description with the second feature description, the first location with the second location, and the first time stamp with the second time stamp;
determine a similarity measure between the first event and the second event based on the comparison of the first feature description with the second feature description, the first location with the second location, and the first time stamp with the second time stamp;
classify the first event and the second event as correlated events when the similarity measure between the first event and the second event is less than a predetermined threshold such that at least one of the first feature description, the first location, and the first time stamp is determined to be sufficiently similar to the second feature description, the second location, and the second time stamp; and classify the first event and the second event as not correlated events when the similarity measure between the first event and the second event is equal to or greater than a predetermined threshold such that the first feature description, the first location, and the first time stamp are determined not to be sufficiently similar to the second feature description, the second location, and the second time stamp;
identifying the first event in two or more first frames of the first video;
estimating a first future location of the first event in a subsequent frame of the first video based on the first location of the first event in the two or more first frames of the first video;
determining a shift between a center of the two or more first frames and the estimated first future location of the first event;
providing the shift to a source of the first video;
adjusting the source of the first video based on the shift; and
wherein the source of the first video is a camera and wherein adjusting the source of the first video comprises adjusting the camera to center the first event in a frame of the camera.

8. The non-transitory computer readable media of claim 7, wherein the first event and the second event comprise a person moving through a scene, a car moving through a scene, an object moving through a scene, a particular face entering the scene, a face, a shadow, an animal entering a scene, or an automobile entering or leaving a scene.

9. The non-transitory computer readable media of claim 7, wherein the operations further comprise:
determine a first geographic location of the first video;

determine a second geographic location of the second video;

preliminarily classify the first event and the second event as correlated events when at least one of the first geographic location and the first time stamp is determined to be sufficiently similar to the second geographic location and the second time stamp; and preliminarily classify the first event and the second event as not correlated events when the first geographic location and the first time stamp are determined not to be sufficiently similar to the second geographic location and the second time stamp.

* * * * *